United States Patent
Johnson

[11] Patent Number: 6,088,962
[45] Date of Patent: Jul. 18, 2000

[54] PLANT TRANSPLANTING SUPPORT DEVICE AND METHOD

[76] Inventor: Kevin F. Johnson, 1015-3 Falls Creek La., Charlotte, N.C. 28209

[21] Appl. No.: 08/921,792

[22] Filed: Sep. 2, 1997

[51] Int. Cl.⁷ ................................................. A01G 23/04
[52] U.S. Cl. ................................................. 47/73; 47/78
[58] Field of Search ........................... 47/73, 76, 78

[56] References Cited

U.S. PATENT DOCUMENTS

| | | |
|---|---|---|
| D. 136,358 | 9/1943 | Grau . |
| D. 241,453 | 9/1976 | Schwartzburg et al. . |
| 333,643 | 1/1886 | Lewis . |
| 437,565 | 9/1890 | Byrne . |
| 681,066 | 8/1901 | Millingar . |
| 861,046 | 7/1907 | Norum . |
| 923,663 | 6/1909 | Kroeger . |
| 1,031,713 | 7/1912 | Hills . |
| 1,192,824 | 7/1916 | Bohlman . |
| 1,464,534 | 8/1923 | Lovett, Jr . |
| 1,638,693 | 8/1927 | Hooks . |
| 1,707,551 | 4/1929 | Hale . |
| 1,828,448 | 10/1931 | Seidel . |
| 1,953,884 | 4/1934 | McAleer . |
| 1,998,637 | 4/1935 | Radley et al. . |
| 2,045,189 | 6/1936 | Judd . |
| 2,140,932 | 12/1938 | Avery . |
| 2,656,969 | 10/1953 | Kvasnok et al. . |
| 2,827,217 | 3/1958 | Clement . |
| 2,967,652 | 1/1961 | Canfield et al. . |
| 3,195,272 | 7/1965 | Mosher et al. . |
| 3,785,088 | 1/1974 | Guarriello . |
| 4,059,921 | 11/1977 | Moriwaki . |
| 4,223,480 | 9/1980 | Welty . |
| 5,324,581 | 6/1994 | Valencic ............................ 47/73 |

*Primary Examiner*—Michael J. Carone
*Assistant Examiner*—Joanne C. Downs
*Attorney, Agent, or Firm*—Adams Law Firm, P.A.

[57] ABSTRACT

A plant transplanting support device is formed of a sheet material for lining an interior of a container having a bottom and side walls for holding a plant. The support device resides between the container and the root ball of the plant to support and maintain the root ball intact upon transfer of the plant from the container to another container or from the container into a planting bed. The support device includes an elongated sidewall portion for being formed by a user such that its opposite ends converge to define sides of an enclosure. The enclosure is adapted to fit within the container adjacent the side walls of the container. A plurality of leg portions extend outwardly from the sidewall portion at a bottom edge of the enclosure. The leg portions are adapted for being folded upwardly from the bottom edge of the enclosure to an opposite top edge of the enclosure to define an enclosure bottom for residing adjacent the bottom of the container to support the root ball when transplanting the plant.

13 Claims, 6 Drawing Sheets

PLANT TRANSPLANTING SUPPORT DEVICE AND METHOD

TECHNICAL FIELD AND BACKGROUND OF THE INVENTION

This invention relates to a plant transplanting support device and method which permits single or multiple transfers of living plants from one container to another while preserving the root ball and root structure of the plant intact. Direct contact between the hands and the soil is avoided or minimized, and transfer between pots of different sizes and shapes is made easier, neater and quicker.

The invention allows for a convenient and efficient method of transplanting plants from one pot to another pot and from a pot into a planting bed while not separating the plant from its surrounding support until the plant is in its new location. Currently when plants are transplanted from one pot to another they must be removed from contact with their surrounding support prior to planting in the new container or planting bed. This process can cause problems by stressing the plant as it is pulled out of the original pot and also causing additional work for the individual transplanting the plant due to the cleanup effort required to collect all of the loose soil which will ordinarily either fall away from the plant as it separates from the pot or remains adhered to the inside of the pot as the remainder separates. Currently transplanting a plant requires a loosening of the soil in order to remove the plant with the roots intact. In the preferred embodiment, the invention is used much like a mold, so that it can be opened from the side and removed from around the root ball without pulling or shaking, and without the resulting cleanup effort needed to collect the loose soil.

SUMMARY OF THE INVENTION

Therefore, it is an object of the invention to provide an device which allows for multiple transplanting of living plants and plant soil while maintaining the original shape of the plant and surrounding plant soil as it exists in a particular container. This allows for plants to be transplanted from one pot to another without disturbing the root structure or separating the root structure from the soil or fertilizer.

It is another object of this invention to provide an device which will allow plants to be transplanted without subjecting the plants to the trauma associated with exposing a majority of the root structure to light, bending or breaking, or drying caused by prolonged exposure to the air.

It is a further object of the invention to provide an device which will allow plants to be transplanted without exposing the plant to stress caused by tugging on the plant and/or shaking or striking the side of the plant container in order to dislodge the roots and compacted soil from contact with the inside of the pot.

It is another object of the invention to provide a convenient and efficient method of transplanting plants from one pot to another pot and from a pot into a planting bed while not separating the plant from its surrounding support until the plant is in its new location.

These and other objects of the present invention are achieved in the preferred embodiments disclosed below by providing a plant transplanting support device formed of a sheet material for lining an interior of a container having a bottom and side walls for holding a plant. The support device resides between the container and the root ball of the plant to support and maintain the root ball intact upon transfer of the plant from the container to another container or from the container into a planting bed. The support device includes an elongated sidewall portion for being formed by a user such that its opposite ends converge to define sides of an enclosure. The enclosure is adapted to fit within the container adjacent the side walls of the container. A plurality of leg portions extend outwardly from the sidewall portion at a bottom edge of the enclosure. The leg portions are adapted for being folded upwardly from the bottom edge of the enclosure to an opposite top edge of the enclosure to define an enclosure bottom for residing adjacent the bottom of the container to support the root ball when transplanting the plant.

According to one preferred embodiment of the invention, the device includes two leg portions extending outwardly from the sidewall portion.

According to another preferred embodiment of the invention, the device includes three leg portions extending outwardly from the sidewall portion.

According to yet another preferred embodiment of the invention, the leg portions are integrally formed with the sidewall portion.

According to yet another preferred embodiment of the invention, the leg portions extend perpendicular to the length of the sidewall portion prior to folding.

According to yet another preferred embodiment of the invention, the converging ends of the sidewall portion overlap to form a generally round structure.

According to yet another preferred embodiment of the invention, attachment means are provided for attaching the overlapping converging ends of the sidewall portion together.

According to yet another preferred embodiment of the invention, attachment means are provided for removably attaching respective free ends of the leg portions to the sidewall portion at the top of the enclosure.

According to yet another preferred embodiment of the invention, the sidewall portion and the leg portions are formed of a plastic film.

According to yet another preferred embodiment of the invention, the sidewall portion and the leg portions are formed of an open mesh fabric netting.

An embodiment of the method according to the invention comprises the steps of lining an interior of the container with a plant transplanting support device, as described above. The plant is then potted with a sufficient amount of soil within the enclosure defined by the support device. The support device is then lifted upwardly out of the container with the root ball of the plant supported and held intact. The plant is then transferred from the container to another container or from the container to a planting bed.

A further embodiment of the method includes the step of removing the plant transplanting support device from around the root ball of the plant after transplanting.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
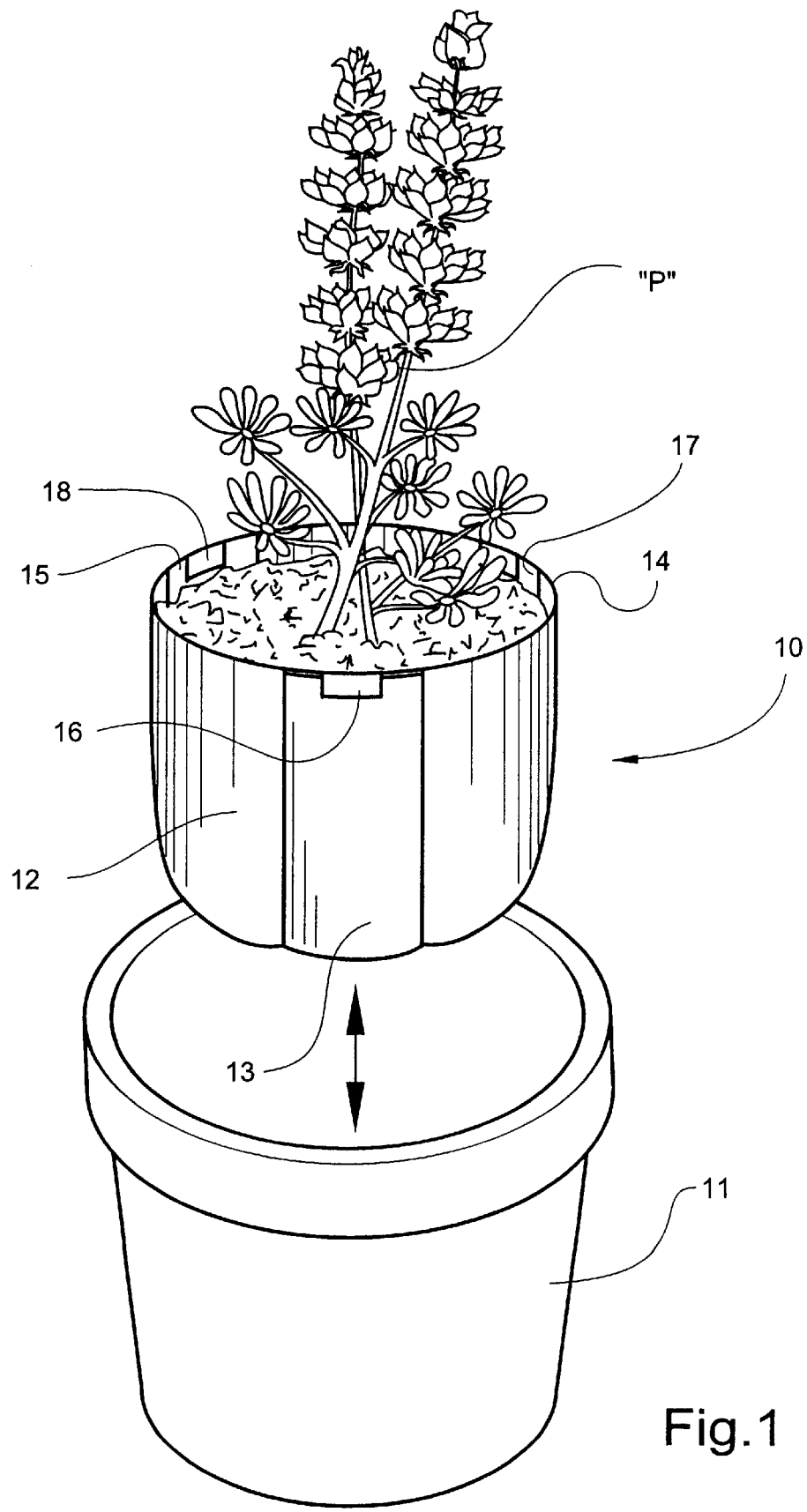
FIG. 1 is an environmental perspective view of the plant transplanting support device according to one preferred embodiment of the invention.
Figure 2:
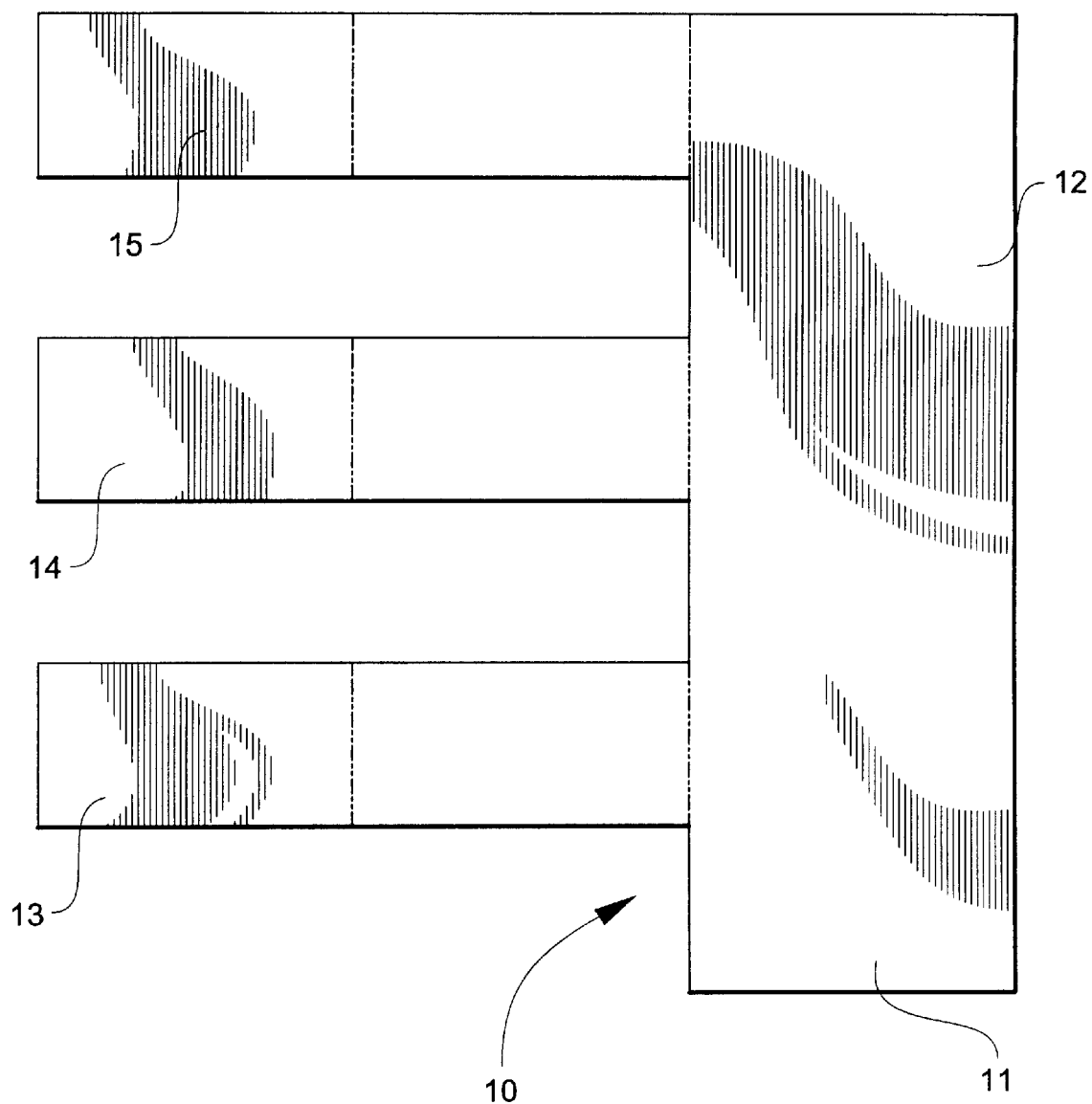
FIG. 2 is a plan view of the device of FIG. 1.

Referring now specifically to the drawings, a plant transplanting support device according to the present invention is illustrated in FIG. 1 and shown generally at reference numeral 10. The device 10 is formed of a sheet material, such as a lightweight plastic film or fabric netting, having sufficient strength to support and lift the plant "P" and root ball when the plant is removed from a pot 11 for transplanting. As best shown in FIG. 2, the sheet includes an elongated sidewall portion 12 off of which branch three leg portions 13, 14 and 15. Preferably, the device 10 is integral, so that the entire structure can be die-cut from a single sheet of material.

Figure 3:
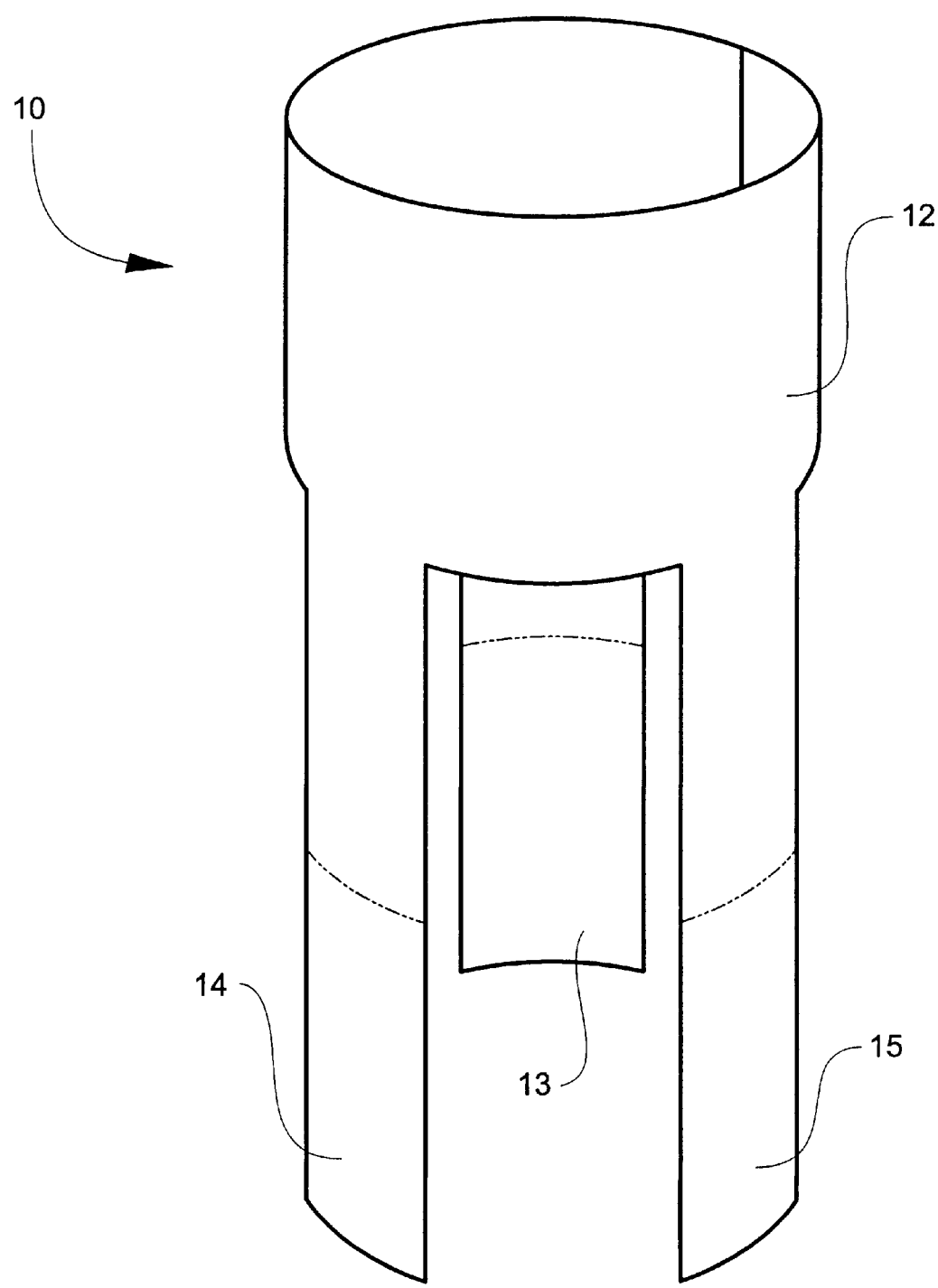
FIG. 3 is a perspective view of the device of FIG. 1 when formed into an intermediate shape in preparation for receiving a plant.

Initial assembly of the device 10 is shown in FIG. 3, where the opposing ends of the elongate sidewall portion 12 are overlapped and attached by fasteners such as tape, a small staple, glue or other suitable attachment means. The sidewall portion 12 is overlapped so that it forms a round structure which will fit into the interior of a similarly-sized round, or larger, variously-shaped pot in which the plant is to be initially planted.

Figure 4:
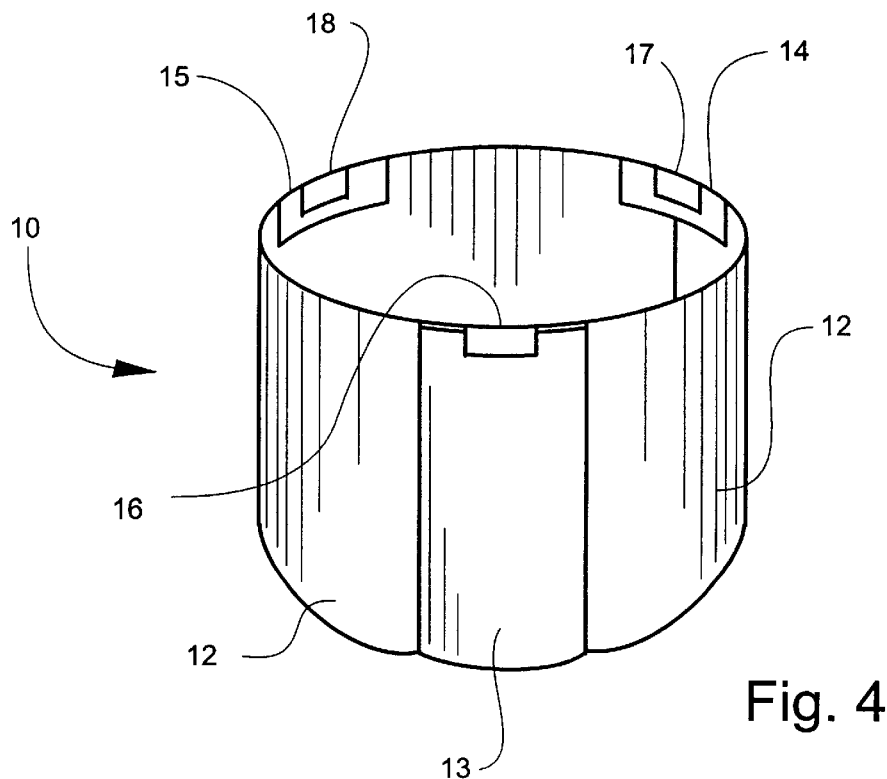
FIG. 4 is a perspective view of the device of FIG. 1 in its final shape.

As shown in FIGS. 1 and 4, the leg portions 13, 14, and 15 are folded around the bottom of the device 10 and extend up the opposite side, being attached near the top with fasteners 16, 17, and 18, such as tape, glue, a staple or other suitable attachment means. In this configuration the plant, together with the proper amount of soil, is placed into the device 10, which is thereafter supported and hidden by the pot 11.

When the time comes to transplant the plant "P", the entire plant can be removed from the pot 11 by grasping the device 10 near the top edge and pulling it out of the pot 11. Preferably, the device 10 is grasped at the top edge where one or more of the leg portions 13, 14, and 15 are attached to the sidewall portion 12. The legs 13, 14, and 15 provide reinforced support strength at these points as the device 10 is lifted from the pot 11. Sticking or other difficulty in removing the device 10 can be corrected by running a knife or other thin object between the pot 11 and device 10 without injuring the plant "P".

Figure 5:
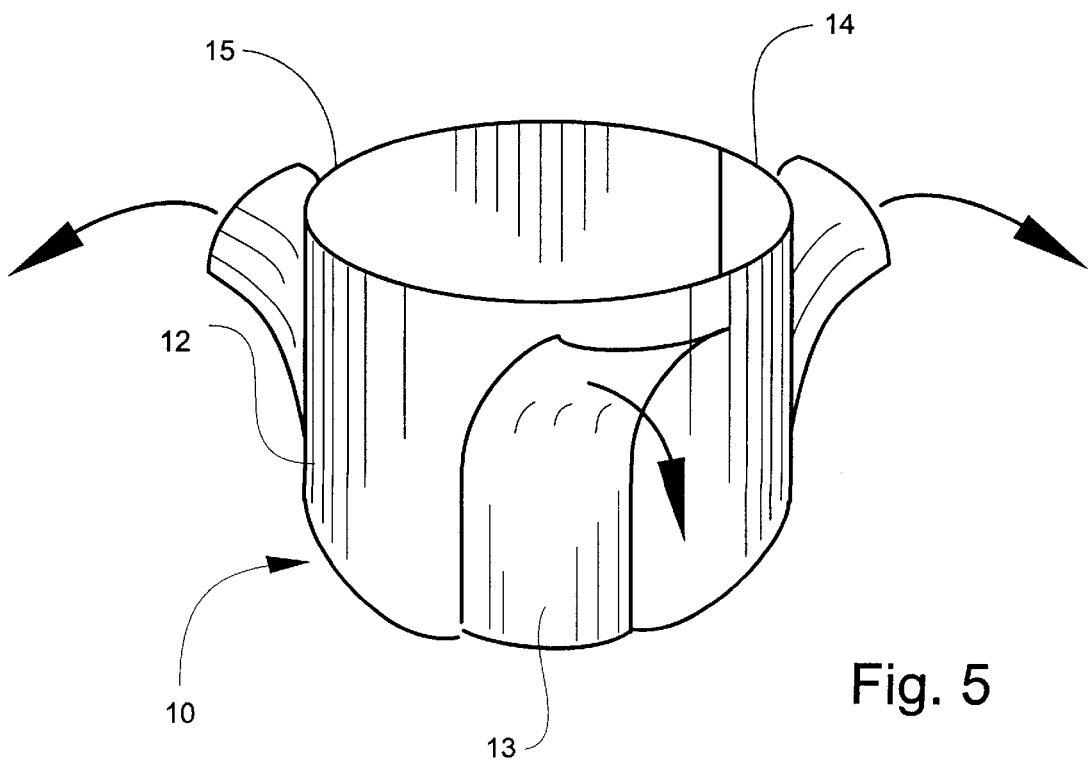
FIG. 5 is a perspective view of the device of FIG. 1 showing the manner of unfolding the device to release the plant.

Once removed from the old pot, the plant, still protected by and contained within the device 10 is placed in the new pot or the planting bed. Then, the legs 13, 14 and 15 are detached from their position against the sidewall portion 12 and lowered, as shown in FIG. 5. The opposite ends of the sidewall portion 12 are then detached from each other, exposing the root ball. The device 10 is easily removed from the root ball without disturbing the roots or the soil.

Alternatively, a weakness line, such as may be formed by perforations, may be provided in the sidewall for removing the sidewall portion 12 from the root ball.

Figure 6:
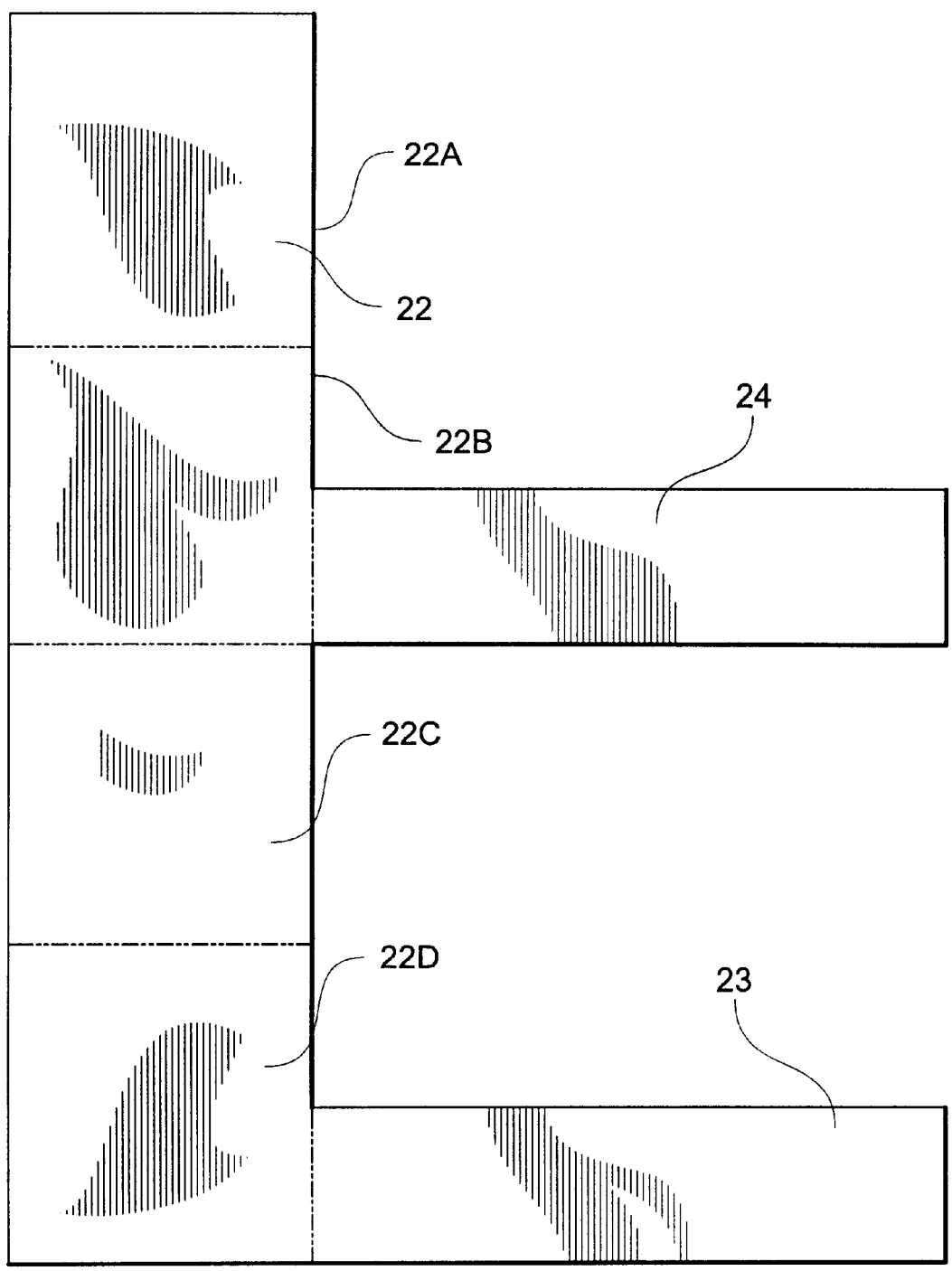
FIG. 6 is a plan view of a plant transplanting support device according to another embodiment of the invention.

Referring now to FIG. 6, a similar plant transplanting support device 20 is shown particularly intended for a square pot (not shown). A sidewall segment 22 comprised of four equally-sized sidewall panels 22A, 22B, 22C, 22D forming the sidewall of the device. Two legs 23 and 24 integrally formed as shown form the bottom of the device 20 when folded under and up the opposite side of the sidewall segment 22.

Figure 7:
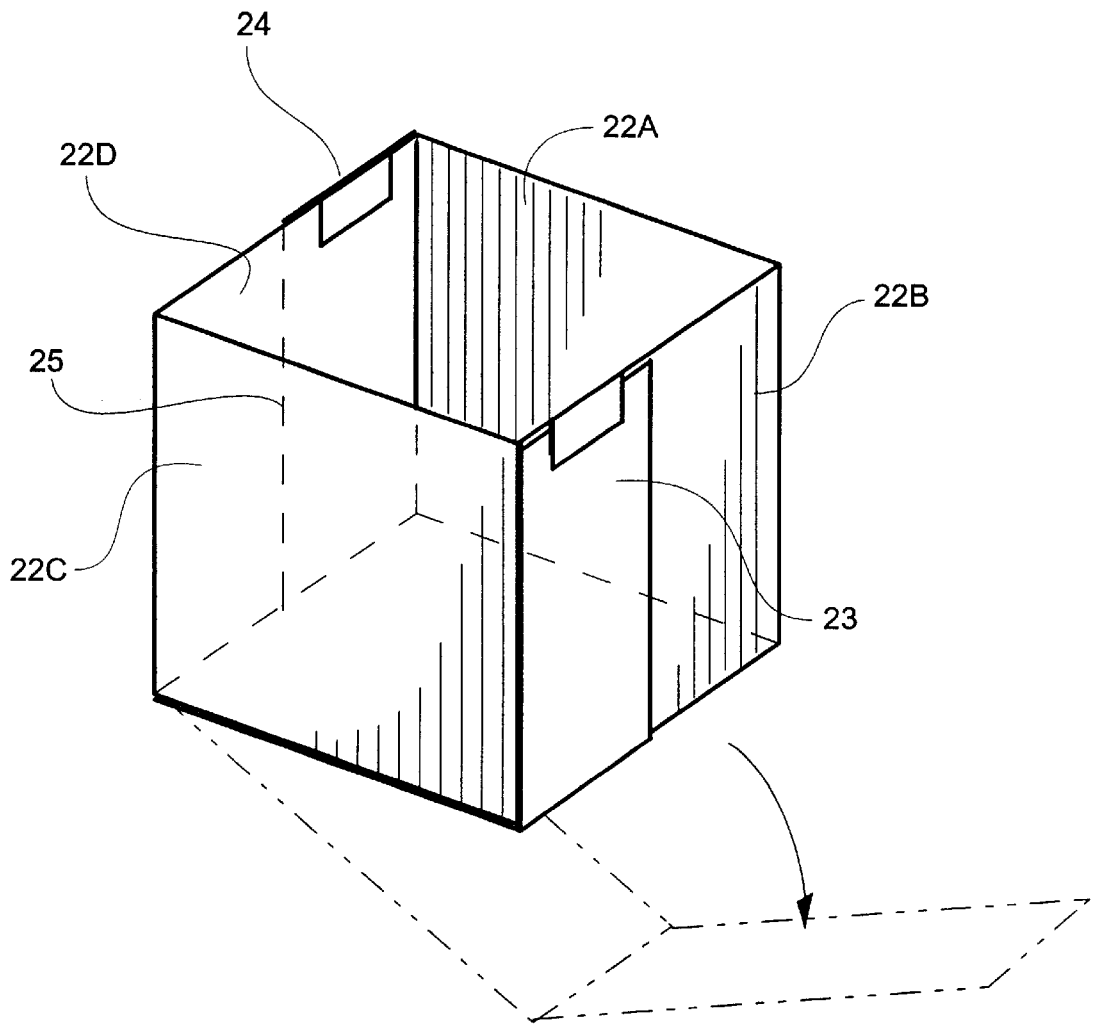
FIG. 7 is a perspective view of the device of FIG. 6, showing the assembly of the device and the manner in which the device is unfolded to release the plant.

As is shown in FIG. 7, the sidewalls 22A–22D are folded to form a square, and the two adjacent edges are attached in any suitable manner to form a box-shaped structure. Leg 23, which is integral with panel 22D, is folded under and up the opposite side and attached to the top edge of panel 22B. Likewise, leg 24, which is integral with panel 22B, is folded under and up the opposite side and attached to the top edge of panel 22D. The two legs 23 and 24 thus form a bottom of the box-shaped device 20.

In this configuration the plant, together with proper soil, is placed into the device 20, which is supported and hidden by the pot.

When time comes to transplant the plant, the entire plant can be removed from the pot by grasping the device 20 near the top edge and pulling it out of the pot. Sticking or other difficulty in removing the device 20 can be corrected by running a knife or other thin object between the pot and device 20 without injuring the plant. Once removed from the old pot, the plant, still protected by and contained within the device 20 is placed in the new pot or the planting bed. Then, the legs 23 and 24 are detached from their position against the sidewall portion 22 and lowered, as shown in FIG. 7. Then, any two adjacent segments 22A–22D of sidewall portion 22 are then detached and separated from each other, exposing the root ball. The device 20 is easily removed from the root ball without disturbing the roots or the soil.

Alternatively, a weakness line 25, such as may be formed by perforations, may be provided in the sidewall portion 22 for removing the sidewall portion 22 from the root ball.

A plant transplanting support device is described above. Various details of the invention may be changed without departing from its scope. Furthermore, the foregoing description of the preferred embodiment of the invention and the best mode for practicing the invention are provided for the purpose of illustration only and not for the purpose of limitation-the invention being defined by the claims.

I claim:

1. A plant transplanting support device formed of a sheet material for being assembled to line an interior of a container having a bottom and side walls for holding a plant, and residing between the container and the root ball of the plant to support and maintain the root ball intact upon transfer of the plant from the container to another container or from the container into a planting bed, said device comprising:

(a) an elongated sidewall portion for being formed by a user such that its opposite ends converge to define sides of an enclosure when the device is assembled, the enclosure being adapted to fit within the container adjacent the side walls of the container; and (b) a plurality of leg portions extending outwardly from the sidewall portion at an edge thereof, and adapted for being folded upwardly from a bottom edge of the enclosure when the device is assembled to an opposite top edge of the enclosure to define an enclosure bottom for residing adjacent the bottom of the container to support the root ball when transplanting the plant.

2. A plant transplanting support device according to claim 1, wherein the device includes two leg portions extending outwardly from the sidewall portion.

3. A plant transplanting support device according to claim 1, wherein the device includes three leg portions extending outwardly from the sidewall portion.

4. A plant transplanting support device according to claim 1, wherein the leg portions are integrally formed with the sidewall portion.

5. A plant transplanting support device according to claim 1, wherein the leg portions extend perpendicular to the length of the sidewall portion prior to folding.

6. A plant transplanting support device according to claim 1, wherein converging ends of the sidewall portion overlap when assembled to form a generally round structure.

7. A plant transplanting support device according to claim 6, and including attachment means for attaching the overlapping converging ends of the sidewall portion together.

8. A plant transplanting support device according to claim 1, and including attachment means for removably attaching respective free ends of the leg portions to the sidewall portion at the top of the enclosure when the device is assembled.

9. A plant transplanting support device according to claim 1, wherein the sidewall portion and the leg portions are formed of a plastic film.

10. A plant transplanting support device according to claim 1, wherein the sidewall portion and the leg portions are formed of an open mesh fabric netting.

11. In combination with a container having side walls and a bottom for holding a plant, the improvement comprising a plant transplanting support device formed of a sheet material for being assembled to line an interior of the container, and residing between the container and the root ball of the plant to support and maintain the root ball intact upon transfer of the plant from the container to another container or from the container into a planting bed, said device comprising:

(a) an elongated sidewall portion for being formed by a user such that its opposite ends converge to define sides of an enclosure when the device is assembled, the enclosure being adapted to fit adjacent the side walls of the container; and (b) a plurality of leg portions extending outwardly from the sidewall portion at an edge thereof, and adapted for being folded upwardly from a bottom edge of the enclosure when the device is assembled to an opposite top edge of the enclosure to define an enclosure bottom for residing adjacent the bottom of the container to support the root ball when transplanting the plant.

12. A method of potting and transplanting a plant, comprising the steps of:

(a) lining an interior of the container with a plant transplanting support device comprising:

i. an elongated sidewall portion for being formed by a user such that its opposite ends converge to define sides of an enclosure when the device is assembled, the enclosure being adapted to fit adjacent the side walls of the container; and ii. a plurality of leg portions extending outwardly from the sidewall portion at an edge thereof, and adapted for being folded upwardly from a bottom edge of the enclosure when the device is assembled to an opposite top edge of the enclosure to define an enclosure bottom for residing adjacent the bottom of the container to support the root ball when transplanting the plant;

(b) potting the plant with a sufficient amount of soil within the enclosure defined by the support device; and (c) lifting the support device upwardly out of the container with the root ball of the plant supported and held intact, and transferring the plant from the container to another container or from the container to a planting bed.

13. A method according to claim 12, and comprising the step of removing the plant transplanting support device from around the root ball of the plant after transplanting.

* * * * *